July 21, 1925.
B. STOCKWELL
AIR BRAKE INDICATOR
Filed March 19, 1925
1,547,077
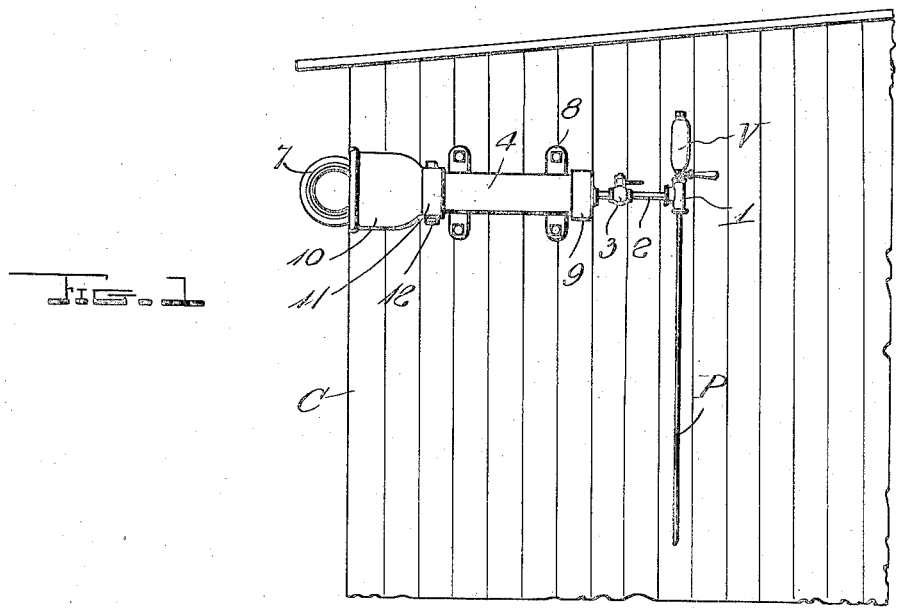

Patented July 21, 1925.

1,547,077

UNITED STATES PATENT OFFICE.

BERT STOCKWELL, OF TACOMA, WASHINGTON.

AIR-BRAKE INDICATOR.

Application filed March 19, 1925. Serial No. 16,870.

*To all whom it may concern:*

Be it known that I, BERT STOCKWELL, a citizen of the United States, residing at Tacoma, in the county of Pierce and State of Washington, have invented certain new and useful Improvements in Air-Brake Indicators; and I do declare the following to be a full, clear, and exact description of the invention, such as will enable others skilled in the art to which it appertains to make and use the same.

Defective brakes are annually costing the railroads of the United States and other countries, a tremendous amount every year, as so far there is no device in use for determining whether the brakes on box cars or passenger coaches are working properly, and from my experience of over twenty years on railroad work, I wish to briefly describe a few incidents which frequently occur in connection with trains and cause a great deal of trouble and delay in testing the brakes, whether on the road or on repair tracks and sidings.

When a train is on the road and the brakes do not release, flat wheels are caused, as such wheels are held firmly and trailed on the rails, and in a great many instances, these flat spots have been known to break the rails and to cause the cars to jump the track, very often causing serious wrecks. When a train crew learns that there are brakes sticking somewhere on the train, the first thing they do is to stop the train and bleed the air from every car to make sure they get the right one. This means a big delay for the train, as very often the latter is approximately a mile long, and the brakeman must wait by each car until all air has been bled from the brake cylinder, before he proceeds with the bleeding of the next car. On repair tracks, the employee to whom brake testing is entrusted, connects his air hose with the brake system and then, by means of a long bar, tries the brakes of the numerous cars to see if they are properly holding.

Such operations as those above set forth, require the expenditure of a great deal of time and labor, both to locate on which car or cars the brakes are not releasing, and to repair the damage done to the wheels at least, and often other parts, incurred before it is known that all of the brakes are not properly released. It is the object of my invention however, to provide a simple and inexpensive attachment for railway cars which is preferably of such design that it can be seen at a distance, for instance, from the caboose of a freight train or from an engine cab, said attachment showing at a glance whether the brakes of all cars are released when they should be, as well as indicating whether operation of the engineer's control valve, effects application of the brakes of all cars.

With the foregoing in view, the invention resides in the novel subject matter hereinafter described and claimed, the description being supplemented by the accompanying drawing.

Figure 1 is a partial end elevation of a freight car showing the application of my invention.

Figure 2 is a vertical longitudinal sectional view through the indicator showing it in the position which it should assume when the brakes are applied.

Figure 3 is a view similar to Fig. 2 but illustrating the position of the indicator when the brakes are released.

In the drawing above briefly described, C designates a portion of a freight car equipped with pneumatic brakes in the conventional manner. The brake system includes a pipe P which is ordinarily connected directly with a retaining valve V, this valve being commonly located in close proximity to the hand brake of the car. In order to easily install my invention, I may connect it with the pipe P. In accomplishing this, the valve V is detached, a T-coupling 1 is threaded on the upper end of the pipe P, and the valve V is then connected with the upper end of said coupling. To the coupling 1, a pipe 2 is connected, said pipe leading to the indicator and being preferably provided with a bleed valve 3. Instead of connecting the signal to the pipe P, it may be connected to any other desired pressure-containing portion of an air-brake system, and some cars, it will be remembered, are not equipped with the retainer valve V.

Briefly speaking, the indicator comprises a pressure cylinder 4 adapted to be suitably secured to the car, a normally retracted pressure-projected piston 5 in the cylinder having a piston rod 6 extending to the exterior of the latter, and a visible signaling device 7 carried by the outer end of said rod. Whenever pressure is admitted to the cylinder 4 during control of the usual brake mechanism, such pressure will act upon the piston 5 to project the signal 7, and in the present disclosure, this signal projects beyond one side of the car, so that the signals of the cars of an entire train may be viewed from the front or the rear end thereof or from any intermediate point. When the brake system is free of pressure, it is intended that the signal shall return to a retracted position, for which purpose a spring 7 may be provided. It will thus be seen that by means of the invention, the engineer, brakeman or conductor of any train may readily see at a glance whether the brakes of all cars are properly functioning. Thus, the difficulties heretofore encountered, are effectively overcome in an expeditious manner.

In the preferred form of construction, the cylinder 4 is disposed horizontally and is provided with lugs 8 for attaching it to one end of a car. The inner end of this cylinder is preferably closed by a cap 9 having an opening into which the pipe 2 is threaded, while the outer end of the cylinder preferably carries an open-ended sheath 10 to receive the indicator 7, when the latter is retracted as shown in Fig. 3, thus protecting it against snow and ice. This sheath is preferably provided with an annular inwardly extending flange 11 which surrounds the outer end of the cylinder 4 and is secured thereto by cap screws or the like 12. The sheath is also preferably formed with an internal rib 13 which abuts the outer side of a piston rod guiding plate 14, said plate being held by said rib against the outer extremity of the cylinder 4. The piston rod 6 passes slidably through a central opening 15 in this plate and is connected at its inner end with the piston 5, and the spring 7 preferably surrounds said piston rod between said plate and plunger. The cylinder 4 is by preference provided with an internal stop shoulder 16 which limits the outward movement of the piston 5 under the action of fluid under pressure, consequently limiting projection of the indicator 7. The opening in the cylinder through which the rod 6 passes, between the shoulder 16 and the plate 14, it will be observed, is considerably larger than said rod and the spring 7. Thus, battering of the shoulder by the piston 5, cannot inwardly force the metal into contact with the piston rod 6 and consequently, such battering cannot bind this rod against free sliding. The signal 7 is preferably, although not necessarily in the form of a ring secured at its edge to the rod 6. By forming the indicator in this shape, it offers minimum resistance to air pressure and thus there is no danger of such pressure breaking the indicator from the piston rod when it is projected, with the train in rapid motion.

As excellent results may be obtained from the details disclosed, such details are preferably followed. However, within the scope of the invention as claimed, numerous modifications may be made.

I claim:

1. In a railway brake indicator, a pressure cylinder having a rod guide at one end, a rod passing slidably through said guide and provided with a piston in the cylinder, an indicating ring on the outer end of said rod, an annular stop shoulder on the cylinder wall spaced inwardly from said guide to be struck by the piston to limit the movement of the latter toward said guide, and a coiled compression spring surrounding the rod between the piston and guide for returning said rod and its piston after projection thereof to the limit allowed by said shoulder, the cylinder being formed with an opening from said guide to said shoulder, said opening receiving said rod and spring and being of considerably greater diameter than said spring and rod, whereby battering of the shoulder by the piston cannot bind the rod and interfere with sliding thereof.

2. An air brake indicator comprising a pressure cylinder adapted to be mounted on a railway car, a plate abutting the outer end of said cylinder and having a rod-guiding opening, a pressure-actuated piston in the cylinder provided with a rod passing slidably through the aforesaid opening, an indicator secured to the outer end of said rod, a sheath normally housing said indicator and having an annular flange surrounding the edge of said plate, said flange being secured to said outer end of the cylinder and having an internal shoulder abutting the outer side of the aforesaid plate to secure the latter in place against said cylinder, the outer end of said sheath being open to permit projection of the signal by means of said piston, and means for returning said piston after each projection thereof.

In testimony whereof I have hereunto affixed my signature.

BERT STOCKWELL.